US012131438B2

(12) United States Patent
Chen et al.

(10) Patent No.: US 12,131,438 B2
(45) Date of Patent: Oct. 29, 2024

(54) SYNTHETIC APERTURE RADAR (SAR) IMAGE TARGET DETECTION METHOD

(71) Applicants: Anhui University, Hefei (CN); Anhui Zhongke Xinglian Information Technology Co., Ltd., Hefei (CN)

(72) Inventors: Jie Chen, Hefei (CN); Huiyao Wan, Hefei (CN); Zhixiang Huang, Hefei (CN); Xiaoping Liu, Hefei (CN); Bocai Wu, Hefei (CN); Runfan Xia, Hefei (CN); Zheng Zhou, Hefei (CN); Jianming Lv, Hefei (CN); Yun Feng, Hefei (CN); Wentian Du, Hefei (CN); Jingqian Yu, Hefei (CN)

(73) Assignees: Anhui University, Hefei (CN); Anhui Zhongke Xinglian Information Technology Co., Ltd., Hefei (CN)

(*) Notice: Subject to any disclaimer, the term of this patent is extended or adjusted under 35 U.S.C. 154(b) by 346 days.

(21) Appl. No.: 17/668,483

(22) Filed: Feb. 10, 2022

(65) Prior Publication Data
US 2023/0169623 A1    Jun. 1, 2023

(30) Foreign Application Priority Data

Dec. 1, 2021    (CN) ............................ 202111455414

(51) Int. Cl.
*G06T 3/40*    (2024.01)
*G01S 13/90*    (2006.01)
(Continued)

(52) U.S. Cl.
CPC ............ *G06T 3/40* (2013.01); *G01S 13/9021* (2019.05); *G06V 10/40* (2022.01); *G06V 10/764* (2022.01);
(Continued)

(58) Field of Classification Search
None
See application file for complete search history.

(56) References Cited

U.S. PATENT DOCUMENTS

2021/0003697 A1*    1/2021    Zhai ...................... G06N 3/08

FOREIGN PATENT DOCUMENTS

CN    110084210 A  *  8/2019 ............. G06N 3/045

OTHER PUBLICATIONS

H. Peng et al., "Improved YOLOX's Anchor-Free SAR Image Ship Target Detection"; ISSN (Electronic): 2169-3536 Digital Object Identifier: 10.1109/ACCESS.2022.3188387 Publication Date: Jan. 1, 2022; IEEE Access; IEEE; Piscataway, NJ, USA. (Year: 2022).*

(Continued)

*Primary Examiner* — Bernarr E Gregory
(74) *Attorney, Agent, or Firm* — Troutman Pepper Hamilton Sanders LLP; Christopher C. Close, Jr.

(57) ABSTRACT

The present disclosure provides a synthetic aperture radar (SAR) image target detection method. The present disclosure takes the anchor-free target detection algorithm YOLOX as the basic framework, reconstructs the backbone feature extraction network from the lightweight perspective, and replaces the depthwise separable convolution in MobilenetV2 with one ordinary convolution and one depthwise separable convolution. The number of channels in the feature map is reduced by half through the ordinary convolution, features input from the ordinary convolution are further extracted by the depthwise separable convolution, and the convolutional results from the two convolutions are spliced. The present disclosure highlights the unique strong scattering characteristic of the SAR target through the attention enhancement pyramid attention network (CSEMPAN) by integrating channels and spatial attention mechanisms. In
(Continued)

view of the multiple scales and strong sparseness of the SAR target, the present disclosure uses an ESPHead.

7 Claims, 8 Drawing Sheets

(51) Int. Cl.
*G06V 10/40* (2022.01)
*G06V 10/764* (2022.01)
*G06V 10/77* (2022.01)
*G06V 10/774* (2022.01)
*G06V 10/94* (2022.01)

(52) U.S. Cl.
CPC ........ *G06V 10/7715* (2022.01); *G06V 10/774* (2022.01); *G06V 10/95* (2022.01); *G06V 2201/07* (2022.01)

(56) References Cited

OTHER PUBLICATIONS

Y. Jiang et al., "R-CenterNet+: Anchor-Free Detector for Ship Detection in SAR Images"; published in Sensors, 2021, 21, 5693; posted on the Internet at mdpi.com; published Aug. 24, 2021. (Year: 2021).*

Z. Ge et al., "YOLOX: Exceeding YOLO Series in 2021"; arXiv:2017.08430v2 [cs.CV]; Aug. 6, 2021. (Year: 2021).*

H. Zhang et al, "EPSANet: An Efficient Pyramid Squeeze Attention Block on Convolutional Neural Network"; arXiv:2105.14447v2 [cs.CV] Jul. 22, 2021. (Year: 2021).*

M. Sandler, A. Howard, M. Zhu, A. Zhmoginov and L.-C. Chen, "MobileNetV2: Inverted Residuals and Linear Bottlenecks," 2018 IEEE/CVF Conference on Computer Vision and Pattern Recognition, Salt Lake City, UT, USA, 2018, pp. 4510-4520, doi: 10.1109/CVPR.2018.00474. (Year: 2018).*

X. Ma, S. Hou, Y. Wang, J. Wang and H. Wang, "Multiscale and Dense Ship Detection in SAR Images Based on Key-Point Estimation and Attention Mechanism," in IEEE Transactions on Geoscience and Remote Sensing, vol. 60, pp. 1-11, 2022, Art No. 5221111, doi: 10.1109/TGRS.2022.3141407. (Year: 2022).*

G. Jianxin, W. Zhen and Z. Shanwen, "Multi-Scale Ship Detection in SAR Images Based on Multiple Attention Cascade Convolutional Neural Networks," 2020 International Conference on Virtual Reality and Intelligent Systems (ICVRIS), Zhangjiajie, China, 2020, pp. 438-441. (Year: 2020).*

Y. Zhao, L. Zhao, B. Xiong and G. Kuang, "Attention Receptive Pyramid Network for Ship Detection in SAR Images," in IEEE Journal of Selected Topics in Applied Earth Observations and Remote Sensing, vol. 13, pp. 2738-2756, 2020, doi: 10.1109/JSTARS.2020.2997081. (Year: 2020).*

H. Jing, X. Sun, Z. Wang, K. Chen, W. Diao and K. Fu, "Fine Building Segmentation in High-Resolution SAR Images via Selective Pyramid Dilated Network," in IEEE Journal of Selected Topics in Applied Earth Observations and Remote Sensing, vol. 14, pp. 6608-6623, 2021, doi: 10.1109/JSTARS.2021.3076085. (Year: 2021).*

W. Yang and Z. Zhang, "SAR Images Target Detection Based on YOLOv5," 2021 4th International Conference on Information Communication and Signal Processing (ICICSP), Shanghai, China, 2021, pp. 342-347, doi: 10.1109/ICICSP54369.2021.9611901. (Year: 2021).*

W. Yu and P. Zhang, "Convolutional Neural Networks' Applications in Automatic Target Recognition for Synthetic Aperture Images," 2021 International Conference of Optical Imaging and Measurement (ICOIM), Xi'an, China, 2021, pp. 9-13, doi: 10.1109/ICOIM52180.2021.9524369. (Year: 2021).*

"Xinhua Dictionary with English Translation"; published by The Commercial Press International Co., LTD.; Peking, China; printed in the year 2000; p. 424, right column, fourth entry in the column. (Year: 2000).*

A. Sankar, "A Primer on Atrous (Dilated) and Depth-wise Separable Convolutions"; dated Sep. 15, 2021; posted on the Internet at towardsdatascience.com. (Year: 2021).*

\* cited by examiner

SYNTHETIC APERTURE RADAR (SAR) IMAGE TARGET DETECTION METHOD

CROSS REFERENCE TO RELATED APPLICATIONS

This patent application claims the benefit and priority under 35 U.S.C. § 119 (e) of Chinese Patent Application No. 202111455414.X filed on 1 Dec. 2021, the disclosure of which is incorporated by reference herein in its entirety as part of the present application.

TECHNICAL FIELD

The present disclosure relates to the technical field of target detection, and in particular, to a synthetic aperture radar (SAR) image target detection method.

BACKGROUND ART

As an active microwave sensor for imaging, the synthetic aperture radar (SAR) provides all-weather characteristics and can keep a high observation capability in harsh environments. With the development of SAR imaging, the SAR has been widely applied to military reconnaissance, topographic mapping, environmental monitoring and natural calamity monitoring. SAR target detection is intended to localize positions and classes of targets in an image. Military applications of SAR target detection can be found in military reconnaissance, regional monitoring, accurate strike, damage evaluation and detection of nuclear explosion. In the civilian field. SAR target detection is used for agricultural planning, forest monitoring, water resource investigation, urban management, environmental protection, geological and mineral exploration, and prediction of ecological environments and natural disasters.

Conventional SAR target detection is mainly the method based on hand-designed features and the method based on a constant false alarm rate (CFAR). The CFAR technology is a signal processing method which sets a threshold for a detection policy and minimizes influences on the CFAR from clutters and interferences. The method based on hand-designed features depends on the manual design; and while characteristics of a target change, it is faced with dramatically decreased detection performance and poor generalization performance. The method based on the CFAR is seriously dependent on cluttering statistical data; and when there are a higher resolution and a more complex background in the SAR image, the estimation on distribution parameters of the target may be inaccurate to greatly reduce the detection performance.

In response to the development of deep learning in recent years, a convolutional neural network (CNN)-based method omits the manual design and improves the generalization performance of algorithms by continuously stacking convolutional layers and automatically learning general features of the target from a large amount of data. Therefore, a number of SAR image detection algorithms have been developed by researchers based on the deep learning.

However, existing SAR target detection tasks based on the deep learning still present the following problems:
(1) Existing SAR target detection based on the deep learning in most cases directly migrates mature target detection networks in the optical image field to SAR target detection tasks, and does not consider detection methods for specific characteristics of the SAR images.
(2) In the pursuit of a higher detection accuracy, the SAR target detection in most cases ignores large volumes of models, such that many models have large parameters and low real-time reasoning speeds. Consequently, the SAR target detection models is hardly deployed on an edge device in actual applications, which greatly restrict the research values of these models.
(3) As SAR images have the large imaging angle, high resolution and variable target scale, anchor-based SAR target detection algorithms are sensitive to sizes and length-width ratios of anchor boxes. Adjustment of hyper-parameters is quite time-consuming and laborious; and the manual parameter adjustment experience has a large impact on the performance of the model to cause instability. In addition, there is a need for the anchor-based detection algorithms to generate many candidate boxes to increase the computational burden of the model. In the anchor-based algorithms, the target detection is implemented based on contour and texture information of the targets. However, due to strong scattering and sparseness of SAR targets, edge contour information of the targets in most cases is not conspicuous enough, and the anchor-based target feature learning methods hardly achieve the desirable result.

In view of the existing problems, the present disclosure provides an SAR image target detection method. The method reconstructs the backbone feature extraction network based on the anchor-free target detection algorithm YOLOX, effectively extracts and keeps multiscale conspicuous feature information of the SAR target by reducing the computational complexity of the model, and highlights unique strong scattering characteristics of the SAR target through an attention enhancement pyramid attention network (CSEMPAN) by integrating channels and spatial attention mechanisms, with better detection performance.

SUMMARY

An objective of the present disclosure is to provide an SAR image target detection method. The method reconstructs the backbone feature extraction network based on the anchor-free target detection algorithm YOLOX, effectively extracts and keeps multiscale conspicuous feature information of the SAR target by reducing the computational complexity of the model, and highlights unique strong scattering characteristics of the SAR target through a CSEMPAN by integrating channels and spatial attention mechanisms, with better detection performance.

The present disclosure provides an SAR image target detection method, including the following steps:
performing feature extraction on an SAR image with a backbone feature extraction network;
inputting a feature extraction result to a CSEMPAN;
performing, by the CSEMPAN, parameter aggregation with features of different scales to extract multiscale information of a target object in the SAR image; and
extracting, by a target detection head ESPHead, spatial hierarchical information of different reception fields from the multiscale information of the target object through different dilation rates.

Further, the method may further include:
taking a lightweight network mobilenetV2S as a basic feature extraction network; and
constructing the backbone feature extraction network with an anchor-free target detection algorithm YOLOX based on the basic feature extraction network.

Further, the constructing the backbone feature extraction network with an anchor-free target detection algorithm YOLOX based on the basic feature extraction network may include:

replacing a depthwise separable convolution in the lightweight network MobilenetV2 with one ordinary convolution and one depthwise separable convolution;

reducing a number of channels in a feature map by half through the ordinary convolution, and extracting features of a feature map from the ordinary convolution through the depthwise separable convolution; and acquiring the backbone feature extraction network.

Further, the performing, by the CSEMPAN, parameter aggregation with features of different scales to extract multiscale information of the target object in the SAR image may include:

selecting a squeeze-and-excitation (SE) module as a channel attention module in the CSEMPAN;

processing the feature extraction result through the channel attention module to perform differential weighting on different channels of an input feature map; and extracting the multiscale information of the target object in the SAR image.

Further, the processing the feature extraction result through the channel attention module to perform differential weighting on different channels of an input feature map may include:

mapping the feature map in the feature extraction result to a size of 1*1*c, c being a number of channels;

learning weighting coefficients of the channels with two convolutional layers each having a kernel size of 1*1;

respectively multiplying the weighting coefficients of the channels by the original features; and convoluting, with a 1*1 convolutional layer, weighting coefficients of the channels obtained by multiplying the original features.

Further, the extracting the multiscale information of the target object in the SAR image may include:

splitting the input feature extraction result into g groups through group convolution;

mapping, by the split groups, the feature map to a size of 1*1 through Global Average Pooling. and seeking a dot product of each of grouped feature maps;

summating the dot product along channel-wise features to obtain a spatial attention mask which is as big as the original feature map and includes one channel;

mapping, by the spatial attention mask, weights of spatial pixels to 0-1 through a sigmoid operation, and multiplying the weights by the original feature map;

re-splicing, by a concat operation, g groups of features to a size of the original feature map;

performing feature extraction on a splicing result with a convolution having a kernel size of 3*3; and changing a convolutional reception field with convolutions having same kernel sizes and atrous rates of 1, 2, 4, 8, 16 to obtain the multiscale information of the target.

Further, the method may further include:

predicting class information and position regression information of the target object in the SAR image with a Decoupled head.

The present disclosure has the following remarkable advantages over the prior art:

The SAR image target detection method provided by the present disclosure takes the anchor-free target detection algorithm YOLOX as the basic framework, reconstructs the backbone feature extraction network from the lightweight perspective, and replaces the depthwise separable convolution in MobilenetV2 with one ordinary convolution and one depthwise separable convolution. The number of channels in the feature map is reduced by half through the ordinary convolution, features input from the ordinary convolution are further extracted by the depthwise separable convolution, and the convolutional results from the two convolutions are spliced. The present disclosure highlights the unique strong scattering characteristics of the SAR target through the CSEMPAN by integrating channels and spatial attention mechanisms. In view of the multiple scales and strong sparseness of the SAR target, the present disclosure uses an ESPHead. The ESPHead is provided with convolutional enhanced reception fields having different dilation rates, to improve the capability of the model for extracting important information from targets of different scales, and further improve the detection performance. The present disclosure makes optimizations for the characteristics of the SAR image target, specifically, with the utilization of the anchor-free architecture, the present disclosure better meets the unique characteristics of the SAR target, and omits a series of hyper-parameter settings and architectural designs associated with the anchor, thereby greatly reducing the computational burden; and the present disclosure effectively extracts and keeps the multiscale conspicuous feature information of the SAR target by reducing the computational complexity of the model.

DETAILED DESCRIPTION OF THE EMBODIMENTS

The technical solutions in the embodiments of the present disclosure will now be described clearly and completely with reference to the accompanying drawings of the present disclosure. Apparently, the described embodiments are merely a part rather than all of the embodiments of the present disclosure. All other embodiments obtained by a person of ordinary skill in the art based on the embodiments of the disclosure without creative efforts shall fall within the protection scope of the disclosure.

SAR images have unique characteristics, such as few samples, strong scattering, sparseness, multiple scales, complex interference and background, and inconspicuous target edge contour information. Current most SAR image target detection methods are anchor-based algorithms. In order to overcome instability caused by hyper-parameter settings of the anchor-based algorithms in training, the present disclosure proposes an anchor-free SAR image target detection method, namely, the AFSar. For the characteristics of few samples and multiple scales of the SAR targets, the present disclosure redesigns a lightweight backbone, namely MobileNetV2S, to reduce the computational complexity of the model and to improve the capability of extracting multiscale features. Furthermore, the present disclosure proposes an attention enhancement PAN module, called CSEMPAN, which highlights the unique strong scattering characteristics of SAR targets by integrating channels and spatial attention mechanisms. Finally, in view of the multiple scales and strong sparseness of SAR targets, the present disclosure proposes a new target detection head, namely. ESPHead. ESPHead is provided with convolutional enhanced reception fields having different dilation rates, to improve the capability of the model for extracting important information from targets of different scales, and further improve the detection performance.

Since existing anchor-based SAR target detection algorithms cannot solve the problems arising from the multiscale, strong scattering and sparse characteristics of the SAR image targets, the present disclosure provides an AFSar target detection algorithm. The present disclosure takes the latest anchor-free target detection algorithm YOLOX as the basic framework, and makes a series of optimizations according to characteristics of the SAR targets. With the utilization of the anchor-free architecture, the present disclosure better meets the unique characteristics of the SAR targets, and omits a series of hyper-parameter settings and architectural designs associated with the anchor, thereby greatly reducing the computational burden.

For the sake of adapting to the multiple scales and few samples of the SAR targets, meeting actual requirements, further reducing the complexity and accelerating the real-time reasoning speed, the present disclosure reconstructs the backbone feature extraction network from a lightweight perspective. By introducing the MobileNetV2 as the basic feature extraction network, the present disclosure replaces the depthwise separable convolution in the MobilenetV2 with one ordinary convolution and one depthwise separable convolution. As a result, the number of channels in the feature map is reduced by half through the ordinary convolution, features input from the ordinary convolution are further extracted by the depthwise separable convolution, and the convolutional results from the two convolutions are spliced. The objective of the present disclosure is to effectively extract and keep the multiscale conspicuous feature information of the SAR target as much as possible by reducing the computational complexity of the model.

For the strong scattering of the SAR targets, the present disclosure provides a CSEMPAN to highlight the conspicuous and strong scattering information of the SAR targets. Through fusion of channel attention and spatial attention, the module further enhances the feature aggregation and extraction capabilities to highlight the features of the SAR targets, suppress the background information, and make the classification and localization more accurate.

For the multiple scales and strong sparseness of the SAR targets, the present disclosure provides the new target detection head, namely the ESPHead, to extract conspicuous information of SAR sparse targets of different scales. Through atrous convolution modules of different atrous rates, the ESPHead acquires convolutional reception fields of different scales to extract hierarchical feature information in the target space. Features are merged by the add operation to improve the capability of the network for localizing the targets of different scales.

Most backbones in existing YOLOX use the large-scale network architectures such as DarkNet53 and CSPNet. Despite the high detection accuracy, these backbones generally have slow reasoning speeds due to large volumes of models.

Figure 1:
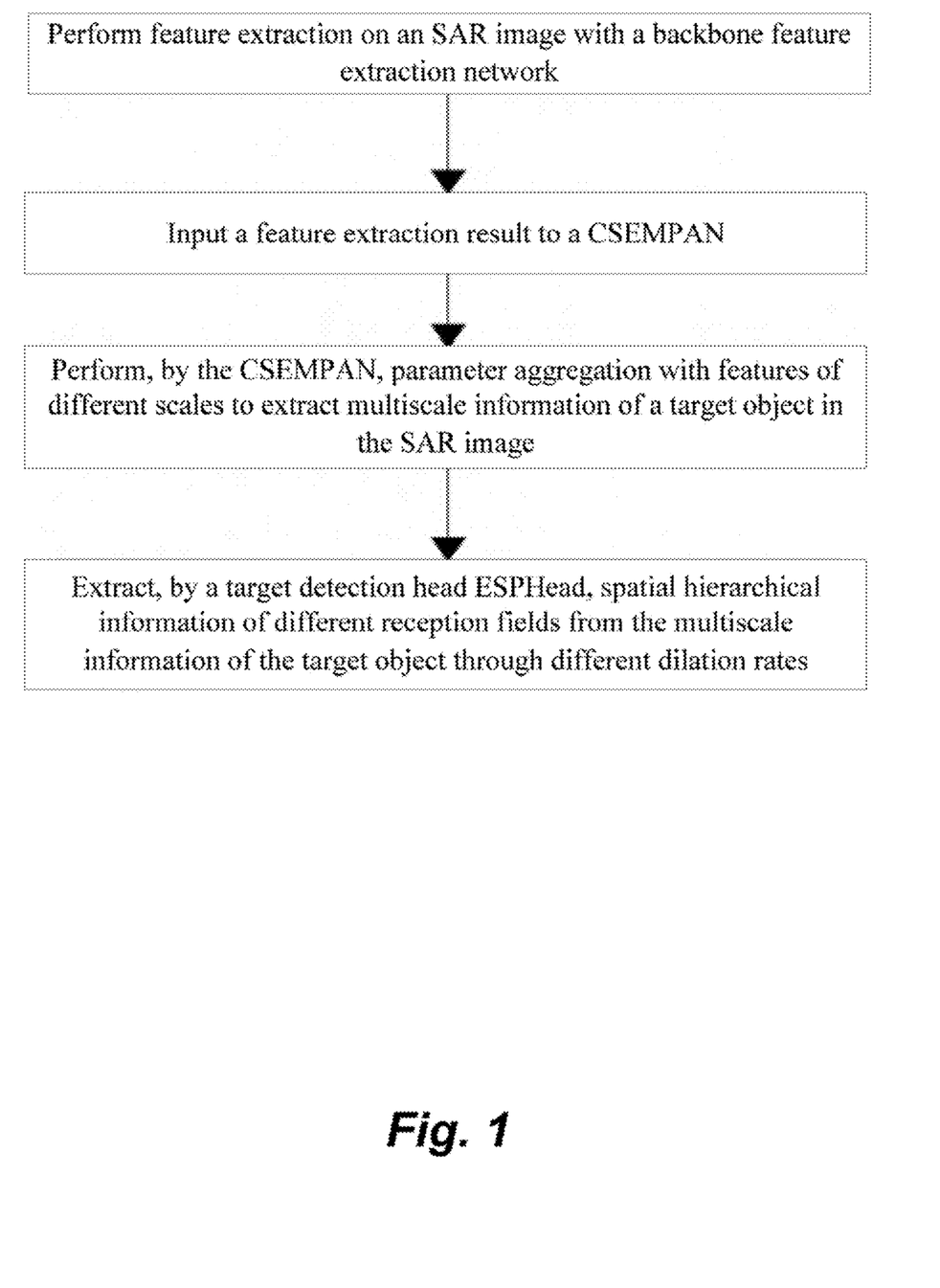
FIG. 1 illustrates a flow chart of an SAR image target detection method according to an embodiment of the present disclosure.
Figure 2:
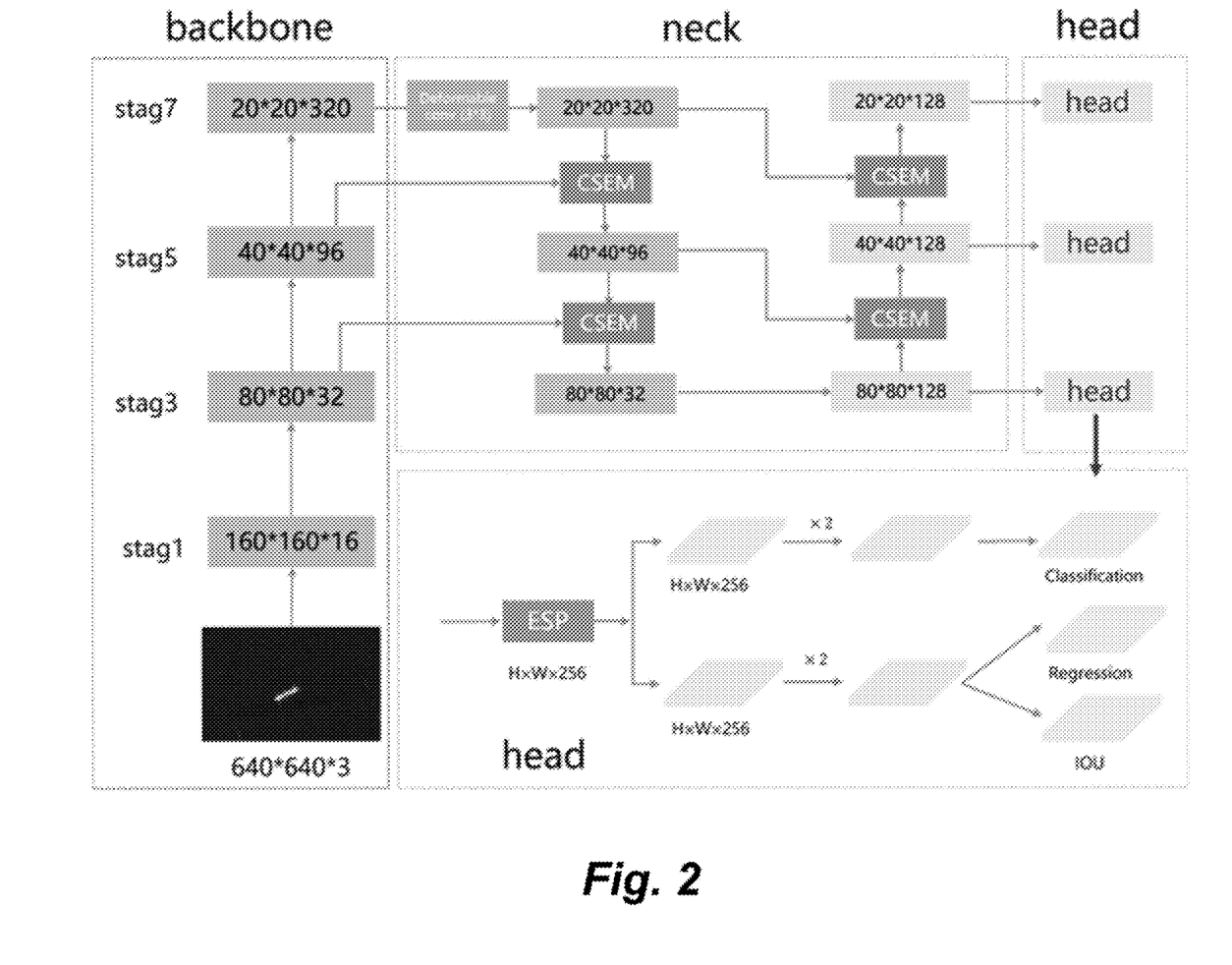
FIG. 2 illustrates an overall framework of an SAR image target detection method according to an embodiment of the present disclosure.

Referring to FIG. 1 to FIG. 8, the present disclosure provides an SAR image target detection method, including the following steps:

Step S1: A lightweight network mobilenetV2S is taken as a basic feature extraction network, as shown in FIG. 2.

Figure 3:
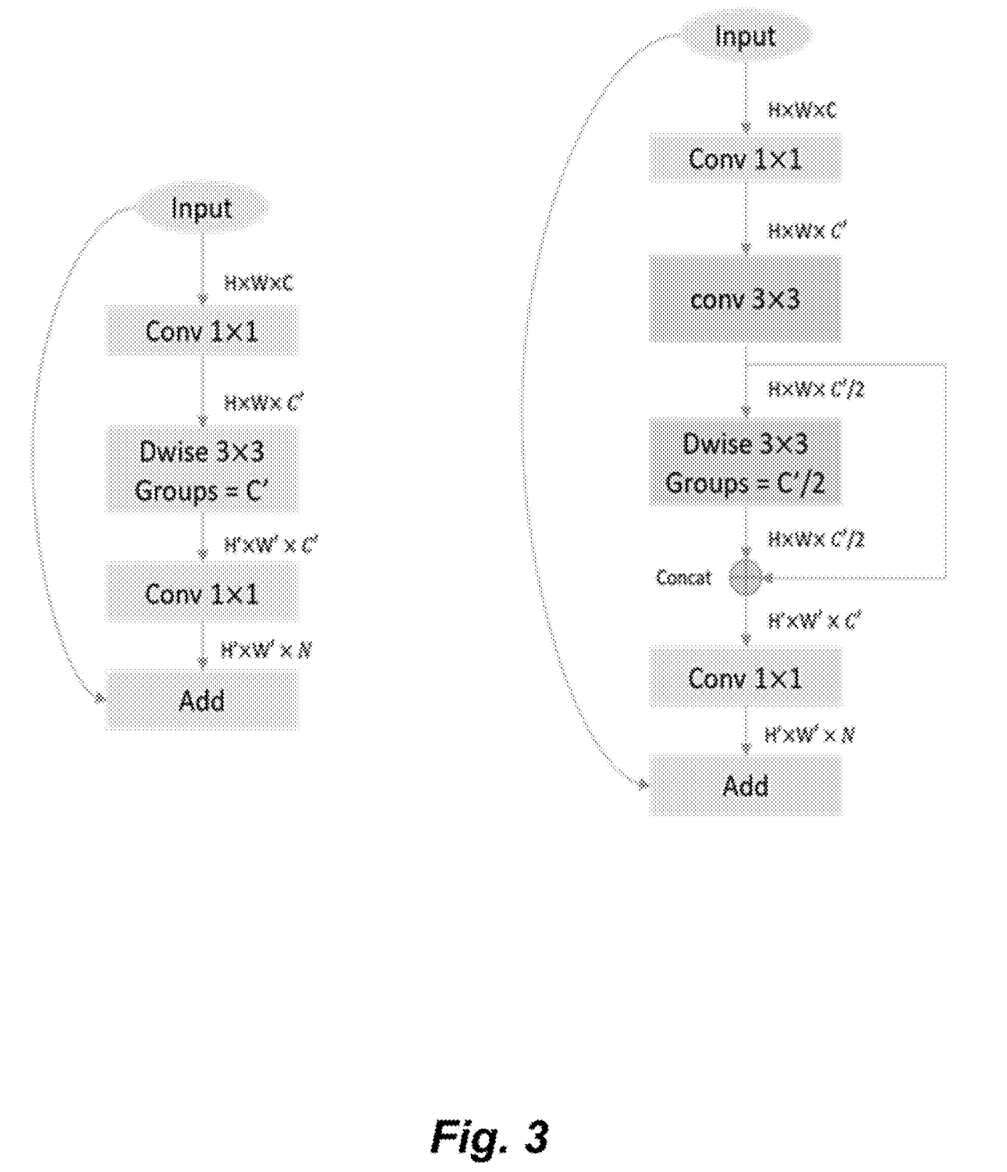
FIG. 3 illustrates a structure of a lightweight network mobilenetV2S according to an embodiment of the present disclosure.

Step S2: As shown in FIG. 3, a backbone feature extraction network is constructed with an anchor-free target detection algorithm YOLOX based on the basic feature extraction network. The latest anchor-free target detection architecture YOLOX is introduced as the basic framework. As the latest anchor-free detection algorithm, the YOLOX omits the anchor parameter settings and the massive anchor-based computations. The step specifically includes:

Step S201: A depthwise separable convolution in the lightweight network MobilenetV2 is replaced with one ordinary convolution and one depthwise separable convolution.

Step S202: A number of channels in a feature map is reduced by half through the ordinary convolution, and features of a feature map from the ordinary convolution are extracted through the depthwise separable convolution.

Step S203: Convolutional results from the two convolutions are spliced to obtain the backbone feature extraction network, which can better acquire the semantic information of data, yield a better modeling capability of the model and make the classification and localization more accurate compared with a solution in which only one depthwise separable convolution is used.

Step S3: Feature extraction is performed on an SAR image with the backbone feature extraction network.

Step S4: A feature extraction result is input to a CSEMPAN, such that the CSEMPAN performs parameter aggregation with features of different scales to better extract multiscale information of an object in the SAR image.

Step S5: The CSEMPAN performs parameter aggregation with features of different scales to extract multiscale information of a target object in the SAR image specifically including:

Step S501: An SE module is selected as a channel attention module in the CSEMPAN.

Step S502: The feature extraction result is processed by the channel attention module to perform differential weighting on different channels of an input feature map, specifically including:

Step S5021: The feature map in the feature extraction result is mapped to a size of 1*1*c, c being a number of channels.

Step S5022: Weighting coefficients of the channels are learnt with two convolutional layers each having a kernel size of 1*1.

Step S5023: The weighting coefficients of the channels are respectively multiplied by the original features.

Step S5024: Weighting coefficients of the channels obtained by multiplying the original features are convoluted with a 1*1 convolutional layer.

Step S503: The multiscale information of the target object in the SAR image is extracted, specifically including:

Step S5031: The input feature extraction result is split into g groups through group convolution.

Step S5032: The groups map the feature map to a size of 1*1 through Global Average Pooling, and a dot product of each of grouped feature maps is sought.

Step S5033: The dot product is summated along channel-wise features to obtain a spatial attention mask which is as big as the original feature map and includes one channel.

Step S5034: The spatial attention mask maps weights of spatial pixels to 0-1 through a sigmoid operation, and the weights are multiplied by the original feature map.

Step S5035: G groups of features are re-spliced through a concat operation to a size of the original feature map.

Step S5036: The feature extraction is performed on a splicing result with a convolution having a kernel size of 3*3.

Step S5037: A convolutional reception field is changed with convolutions having same kernel sizes and atrous rates of 1, 2, 4, 8, 16 to obtain the multiscale information of the target object.

In view of mechanisms and characteristics of the CNN, more stacked convolutional layers mean a larger reception field in the feature map, and richer semantic information and less spatial information in the feature map. The target classification mainly depends on the semantic information acquired by the CNN, while the target localization depends on the reception field of the feature map. The shallow feature map is applied to localization of small targets for the small reception field, while the deep feature map is applied to localization of large targets for the large reception field. The CSEMPAN operation is for the sake of balancing the classification. The top-down and bottom-up multiscale feature aggregation policies are used to fuse information in the shallow and deep feature maps, thus ensuring the accuracy for localizing the small targets and large targets. Due to the scattering characteristics of the SAR images, targets and backgrounds are not distinguished clearly: Without extracting conspicuous information of the targets, the conventional CSEMPAN is highly possible to detect the backgrounds as the targets. In order to solve the above problem, the present disclosure designs the CSEM to suppress background information and highlight conspicuous information of targets.

Figure 4:
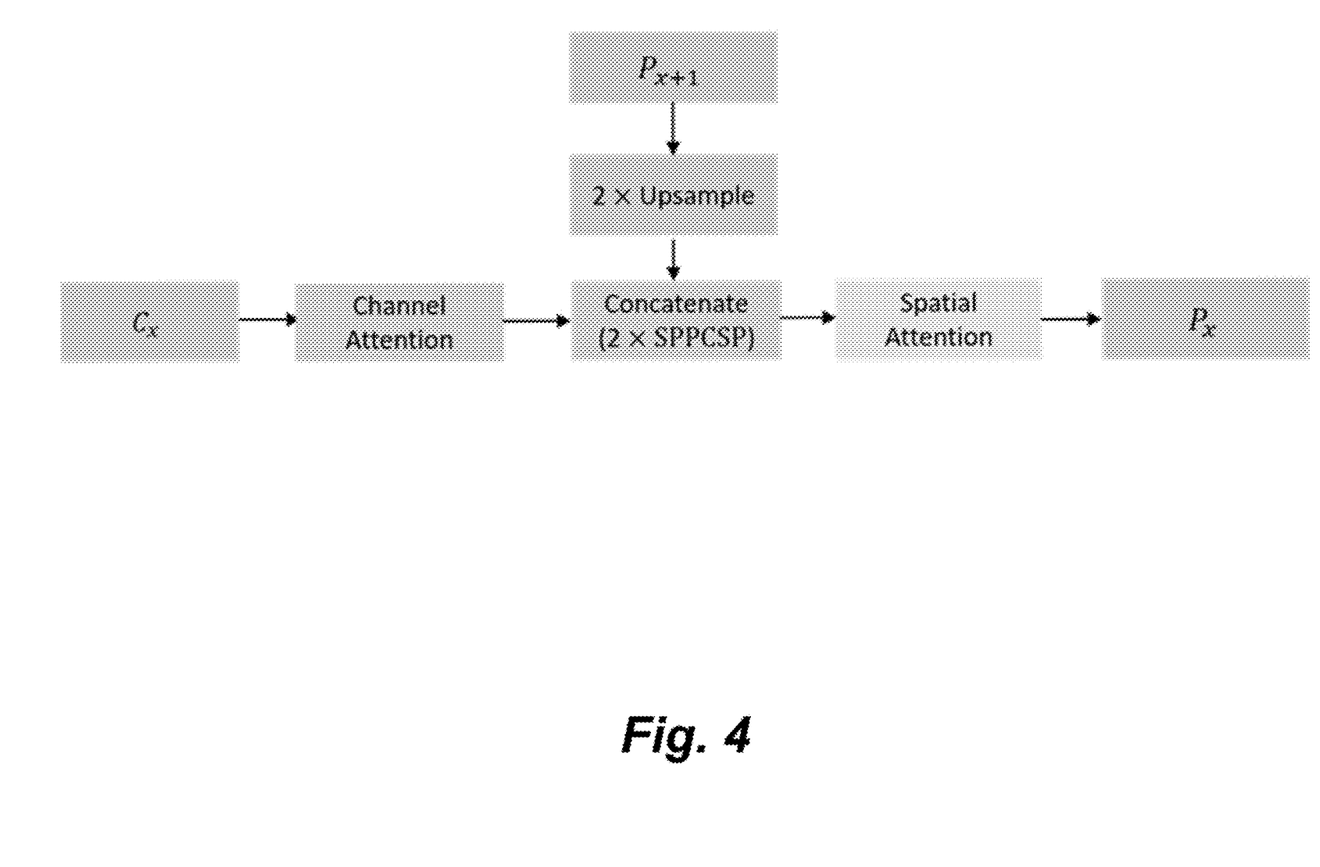
FIG. 4 illustrates a CSEM module according to an embodiment of the present disclosure.

As shown in FIG. 4, the CSEM includes three parts: channel attention, SPPCSP and spatial attention. The CSEM has the following working principles:

$$P_{x+1} = Conv(C_{x+1}) \quad (1)$$

$$C_{x\_s} = Concat(CA(C_x), Upsample(P_{x+1})) \quad (2)$$

$$C_{x\_f} = SPPCSP(SPPCSP(C_{x\_s})) \quad (3)$$

$$P_x = SA(C_{x\_f}) \quad (4)$$

CA represents the channel attention, and SA represents the spatial attention.

Figure 5:
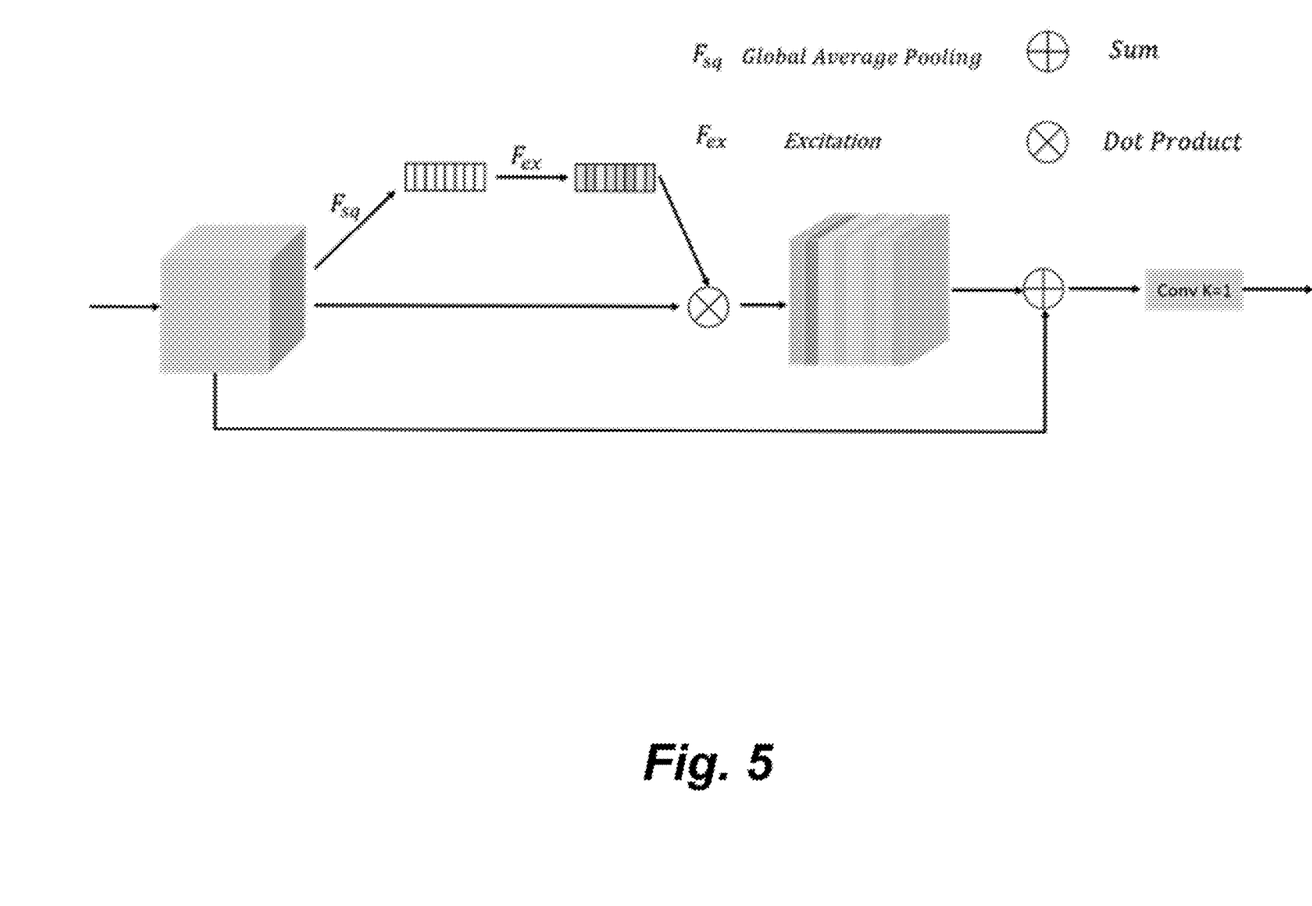
FIG. 5 illustrates a channel attention module according to an embodiment of the present disclosure.

The features $C_x$ extracted by the backbone network are processed by the channel attention to perform differential weighting on different channels of the input feature map, thereby highlighting different degrees of importance for the channels. Concerning the size of the SAR image dataset, the SE module which is used most and has the least parameters is selected as the channel attention to enhance the feature extraction for fear of overfitting. As shown in FIG. 5, the SE module main includes three steps, namely Squeeze, Excitation and Scale. After the input features are processed by the Squeeze operation, the feature map is mapped to the size of 1*1*c (c being the number of channels). Weighting coefficients of the channels are learnt with two convolutional layers each having a kernel size of 1*1 in the Excitation operation. In the Scale operation, the learnt weights (0-1) of the channels are multiplied by the original features. On the basis of SE, operations of multiplying the weights after the SE attention by the original features and performing the convolution with the 1*1 convolutional layer are increased. The working principles of the channel attention module can be summarized as follows:

$$z_c = F_{sq}(u_c) = \frac{1}{H \times W} \sum_{i=1}^{H} \sum_{j=1}^{W} u_c(i, j) \quad (5)$$

$$s_c = F_{ex}(z, W) = \sigma(B(W_2 B(\delta(W_1 z)))) \quad (6)$$

$$\tilde{x} = conv(s_c \cdot u_c + u_c) \quad (7)$$

Figure 6:
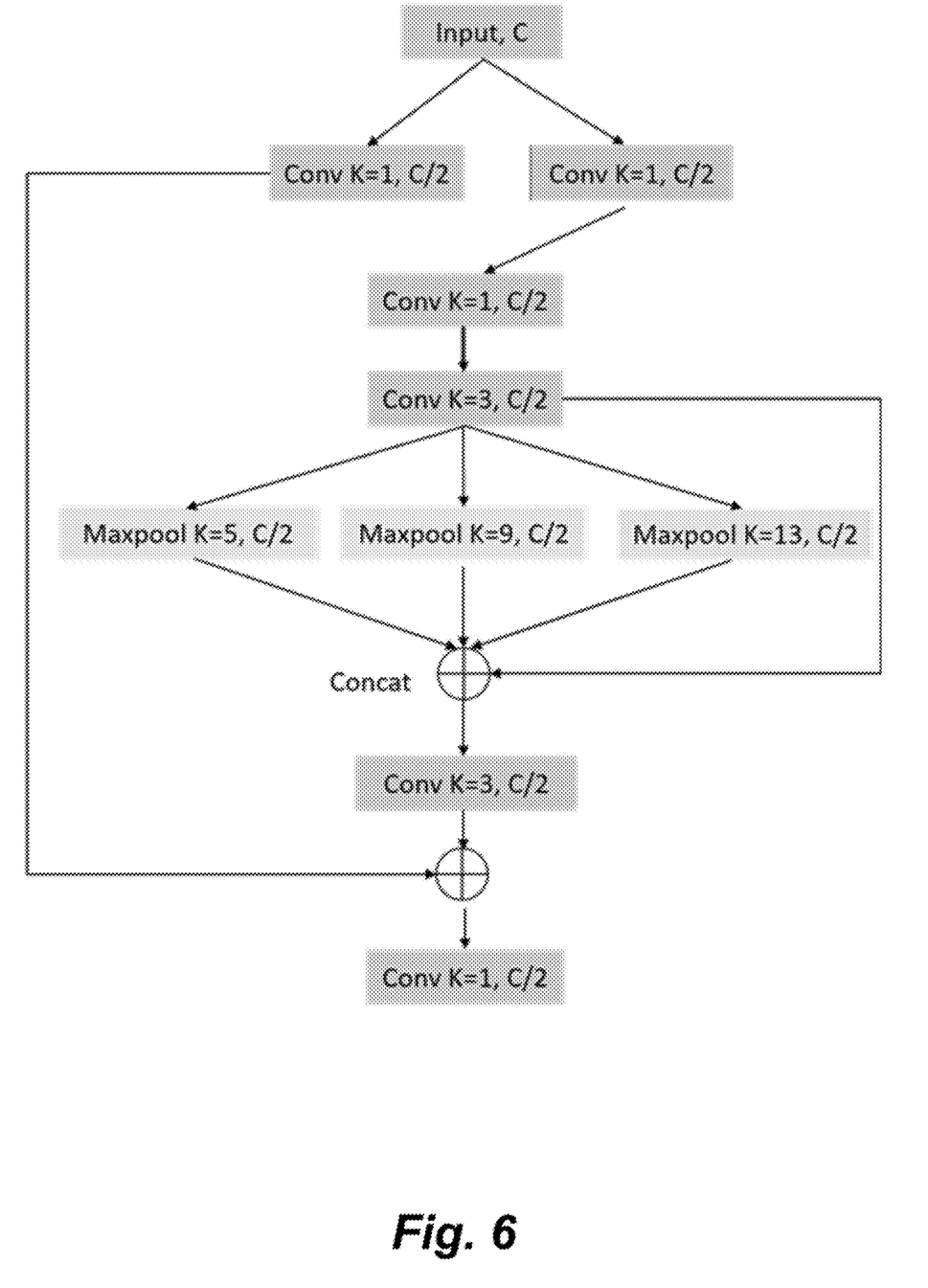
FIG. 6 illustrates a spatial pyramid pooling and cross stage partial (SPPCSP) module according to an embodiment of the present disclosure.

The resolution of the lower feature $C_{x+1}$ to the feature $C_x$ is only a half of the resolution of the feature $C_x$. Before the concat operation, the up-sampling operation is doubled on the feature $C_{x+1}$. The concat operation is performed on the up-sampled feature $C_x$ and the feature $C_{x+1}$; and the feature upon the concat is extracted by SPPCSP twice. As shown in FIG. 6, the SPPCSP includes an SPP module compared with the ordinary CSP module, namely three maxpool operations in which the kernel sizes are {5, 9, 13}, respectively. There are targets of different sizes in SAR images. With the introduction of the SPP module, namely the three maxpool operations having different convolutional kernels, spatial feature information of the targets of different sizes can be extracted to adapt to the multiscale target information.

Figure 7:
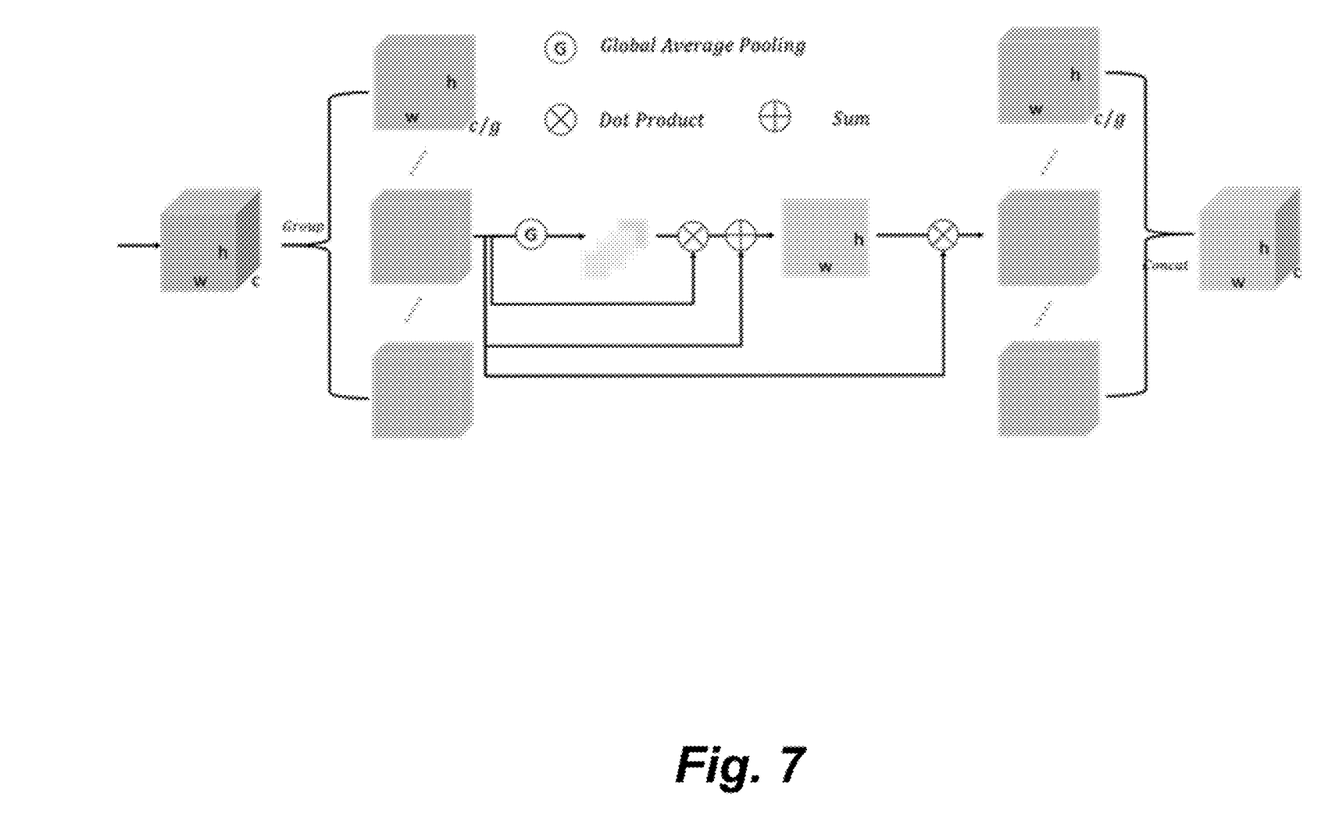
FIG. 7 illustrates a spatial attention module according to an embodiment of the present disclosure.

Whether the targets are localized accurately is directly determined by spatial information of the features. In order to suppress background information and extract conspicuous information of the targets, the spatial attention module is added after the SPPCSP to highlight the spatial information of the targets. As shown in FIG. 7, the spatial attention module splits the input features into g groups through group convolution (g=8), maps the original feature map to the size of 1*1 through Global Average Pooling, seeks a dot product of each of the grouped feature maps, and performs a summation operation along channel-wise features to obtain a spatial attention mask that is as big as the original feature map and includes one channel. The spatial attention mask maps weights of spatial pixels to 0-1 through a sigmoid operation and multiplies the weights by the original feature map to highlight the conspicuous features of the targets. Finally, g groups of features are re-spliced through the concat operation to the size of the original feature map. The spatial attention module has the following working principles:

$$x_1, x_2 \ldots x_g = split(x) \quad (8)$$

$$n_i = F_{GAP}(x_i) = \frac{1}{m} \sum_{i=1}^{m} x_i \quad (9)$$

$$c_i = sum(n_i \cdot x_i) \text{ and} \quad (10)$$

$$x = concat(c_i \cdot x_i) \, i = 1, 2 \ldots g, \quad (11)$$

split is the group convolution, $F_{GAP}$ represents the global average pooling, sum is the summation operation along the channel direction, and concat represents the splicing.

Figure 8:
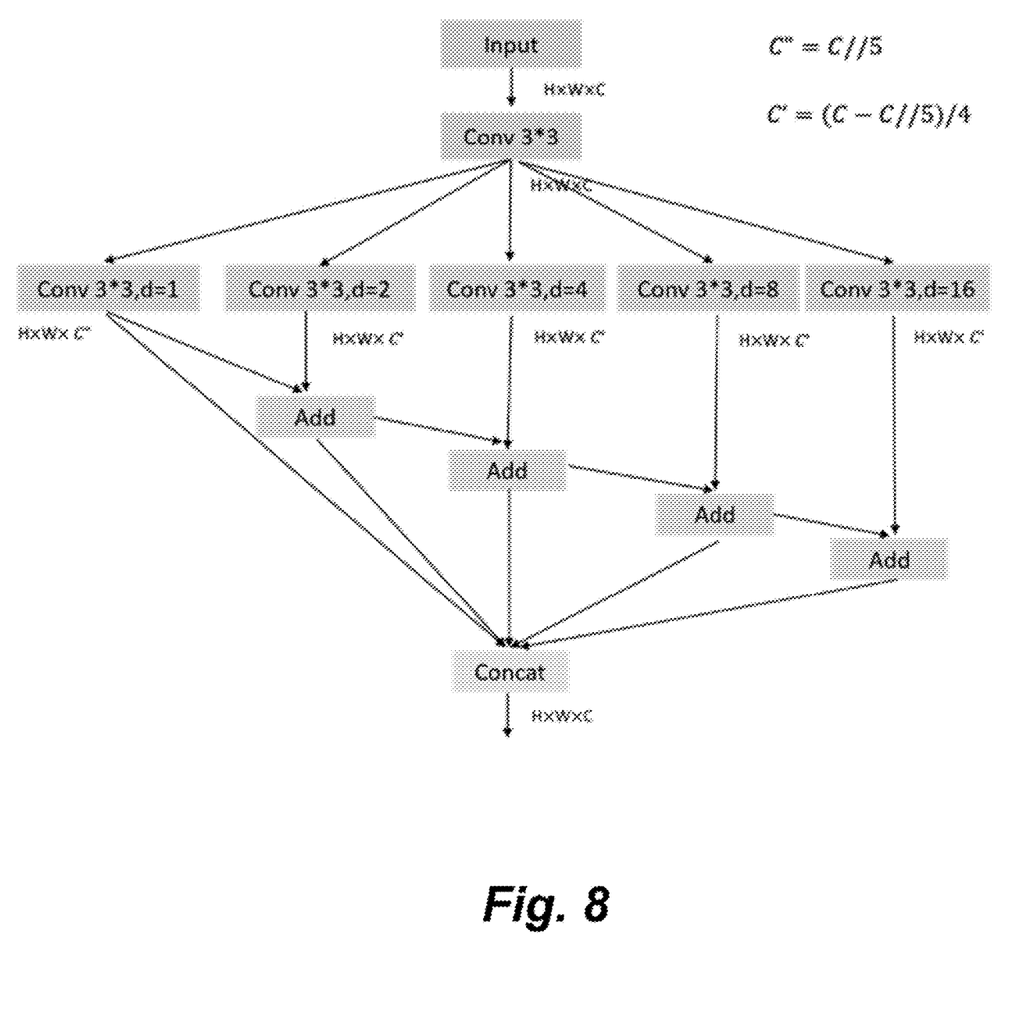
FIG. 8 illustrates a target detection head module ESPHead according to an embodiment of the present disclosure.

Step S6: A target detection head ESPHead extracts spatial hierarchical information of different reception fields from the multiscale information of the target object through different dilation rates.

In order to get information of the targets of different scales, an ESP module is added before the features enter the head. As shown in FIG. 8, the features input to the ESP module are further extracted with a convolution having a kernel size of 3*3; and the convolutional reception field is changed with convolutions having same kernel sizes (3*3) and atrous rates of 1, 2, 4, 8, 16, to obtain the multiscale spatial information of the target. As the number of channels is unnecessarily a multiple of 5, features obtained by dividing 5 from the number of channels through rounding and including C" channels are output by the convolution having the atrous rate of 1; and rest features are equally split into four parts and output by the convolutions having the atrous rates of 2, 4, 8, 16. After the features are output through the atrous convolution, output features from the convolutions having the atrous rates of 1 and 2 are added, and then added with the output feature from the convolution having the atrous rate of 4, and so on. Finally, all features are fused through the concat operation. The multiscale and multilayer feature fusion policy is more favorable to extract the spatial features of the SAR images.

Step S7: Class information and position regression information of the target object in the SAR image are predicted with a Decoupled head of the ESP module.

Step S8: Postprocessing is performed, specifically, positive and negative samples are matched with a simOTA algorithm to compute a loss, and a center location of a target ground-truth (GT) box on the feature map is determined with a down-sampling operation. According to the simOTA, the central 3*3 region includes positive samples, namely one positive sample in each GT is expanded to nine positive samples, intersections over union (IoUs) between the positive samples and the GT are computed and the loss is computed to determine dynamic_k of each GT. Top dynamic_k anchor boxes with minimum losses in each GT are taken as the positive samples, and rest anchor boxes are negative samples to compute the loss to monitor the model training.

The loss function is used to predict the agreement with actual data. Therefore, an appropriate loss function is crucial to optimize the model training. The loss function is trained with three parts:

$$L=\lambda_1 L_{cls}+\lambda_2 L_{obj}+\lambda_3 L_{bbox} \qquad (12)$$

$\lambda_1$, $\lambda_2$ and $\lambda_3$ are weighting coefficients ($\lambda_1$=1, $\lambda_2$=2, $\lambda_3$=5), and $L_{cls}$, $L_{obj}$, and $L_{bbox}$ respectively represent the classification loss, the target loss, and the regression loss.

The cross-entropy loss function is used for the target loss and the classification loss.

$$L(p_i,p_i^*)=-[p_i \log(p_i^*)+(1-p_i)\log(1-p_i^*)] \qquad (13)$$

$p_i$ represents the true value, and $p_i^*$ represents the predicted value.

The IOU loss function is used for the regression loss. The IOU loss represents a difference of the IOU between the predicted box and the true box, and indicates the detection effect for predicting the prediction box. The IOU loss is defined as follows:

$$L=1-\text{IOU} \qquad (14)$$

IOU represents the IOU between the predicted box and the true box.

The novel anchor-free SAR image target detection method provided by the present disclosure is more intelligent. The model can yield the state-of-the-art (SOTA) performance at few floating-point operations per second (Flops).

The above disclosed are only a few specific examples of the present disclosure, and the examples of the present disclosure are not limited thereto. Any changes that can be conceived by those skilled in the art should fall into the protection scope of the present disclosure.

What is claimed is:

1. A synthetic aperture radar (SAR) image target detection method, comprising the following steps:
    performing feature extraction on an SAR image with a backbone feature extraction network;
    inputting a feature extraction result to an attention enhancement pyramid attention network;
    performing, by the attention enhancement pyramid attention network, parameter aggregation with features of different scales to extract multiscale information of a target object in the SAR image; and
    extracting, by a target detection head, spatial hierarchical information of different reception fields from the multiscale information of the target object through different dilation rates.

2. The SAR image target detection method according to claim 1, further comprising:
    taking a lightweight network mobilenetV2 as a basic feature extraction network; and
    constructing the backbone feature extraction network with an anchor-free target detection algorithm YOLOX based on the basic feature extraction network.

3. The SAR image target detection method according to claim 2, wherein the constructing the backbone feature extraction network with the anchor-free target detection algorithm YOLOX based on the basic feature extraction network comprises:
    replacing a depthwise separable convolution in the lightweight network MobilenetV2 with one ordinary convolution and one depthwise separable convolution;
    reducing a number of channels in a feature map by half through the ordinary convolution, and extracting features of the feature map from the ordinary convolution through the depthwise separable convolution; and
    acquiring the backbone feature extraction network.

4. The SAR image target detection method according to claim 1, wherein the performing, by the attention enhancement pyramid attention network, parameter aggregation with features of different scales to extract multiscale information of the target object in the SAR image comprises:
    selecting a squeeze-and-excitation module as a channel attention module in the attention enhancement pyramid attention network;
    processing the feature extraction result through the channel attention module to perform differential weighting on different channels of a feature map; and
    extracting the multiscale information of the target object in the SAR image.

5. The SAR image target detection method according to claim 4, wherein the processing the feature extraction result through the channel attention module to perform differential weighting on different channels of the feature map comprises:
    mapping the feature map in the feature extraction result to a size of 1*1*c, c being a number of channels;
    learning weighting coefficients of the channels with two convolutional layers each having a kernel size of 1*1;
    respectively multiplying the weighting coefficients of the channels by original features; and
    convoluting, with a 1*1 convolutional layer, weighting coefficients of the channels obtained by multiplying the original features.

6. The SAR image target detection method according to claim 4, wherein the extracting the multiscale information of the target object in the SAR image comprises:
- splitting the feature extraction result into g groups through group convolution;
- mapping, by split groups, the feature map to a size of 1*1 through Global Average Pooling, and seeking a dot product of each of grouped feature maps;
- summating the dot product along channel-wise features to obtain a spatial attention mask which is as big as the original feature map and comprises one channel;
- mapping, by the spatial attention mask, weights of spatial pixels to 0-1 through a sigmoid operation, and multiplying the weights by the original feature map;
- re-splicing, by a concat operation, g groups of features to a size of the original feature map;
- performing feature extraction on a splicing result with a convolution having a kernel size of 3*3; and
- changing a convolutional reception field with convolutions having same kernel sizes and atrous rates of 1, 2, 4, 8, 16 to obtain the multiscale information of the target object.

7. The SAR image target detection method according to claim 1, further comprising: predicting class information and position regression information of the target object in the SAR image with a Decoupled head.

* * * * *